UNITED STATES PATENT OFFICE

ADOLF KREBSER, OF BASEL, SWITZERLAND, ASSIGNOR TO THE FIRM OF J. R. GEIGY S. A., OF BASEL, SWITZERLAND

MANUFACTURE OF DISAZODYESTUFFS FOR DYEING AND PRINTING WOOL

No Drawing. Application filed August 30, 1930, Serial No. 479,094, and in Germany August 9, 1929.

I have made the surprising observation that new precious disazodyestuffs result by combining tetrazo compounds of aminodiphenylmethanedisulfonic acids and their derivatives with two molecules of a pyrazolonesulphonic acid.

It could not be foreseen that dyestuffs of the type resulting from aminodiphenylmethanedisulphonic acid and two molecules of a pyrazolonesulphonic acid, which thus contain four sulpho groups symmetrically distributed on the four nuclei, when dyed on wool, would surpass the corresponding dyestuffs unsulphonated in the aminodiphenylmethane residue and which contain only two sulpho groups (see German Patent No. 325,062), with respect to their fastness to light, that they show also a good fastness to fulling and a very good solidity to sulphur, that they leave cotton effects pure white and that they possess—which is particularly important—excellent properties for the direct printing on wool.

These dyestuffs yield on wool, for example with oxalate of ammonia, fairly equalizing, covered prints of pure shade, of good fixation and fastness to water and ammonia and of remarkable fastness to light.

The following examples illustrate the invention:

Example 1

34 kilos of 4:4'-diamino-2:2'-dimethyldiphenylmethane are dissolved at 70° C. in 130 kilos of sulphuric acid in form of monohydrate and mixed slowly at 10° C. with 110 kilos of oleum of 30%. The mass is stirred at 50° C. until a test is clearly soluble in water and dilute soda solution. The thus formed 4:4'-diamino-2:2'-dimethyldiphenylmethane disulphonic acid can be isolated from the reaction mass either by diluting with 4 parts by volume of water, the free sulpho acid separating out, or as sodium salt solution by treatment with lime and mixing with soda. It is then tetrazotized in the usual manner and coupled with an aqueous solution of 78 kilos of para-sulphophenylmethylpyrazolone and 50 kilos of soda. After some hours, the reaction mass is heated and the dyestuff is salted out, filtered and dried. The dyestuff thus isolated constitutes an orange powder. It dissolves easily in water with green-yellow and in concentrated sulphuric acid with pure yellow coloration and yields in dyeing and printing on wool pure yellow shades with the good properties above stated. The dyestuff obtained according to this example has the following formula:

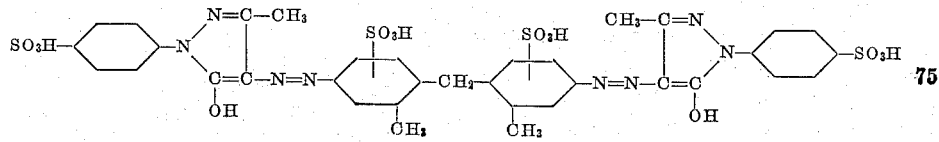

Example 2

34 kilos of 4:4'-diamino-2:2'-dimethyldiphenylmethane are sulphonated in the manner indicated in Example 1. The 4:4'-diamino-2:2'-dimethyldiphenylmethane disulphonic acid thus obtained is then tetrazotized and coupled with 82 kilos of 1(4'-methyl-2'-sulphonic acid)-3-methyl-5-pyrazolone and 50 kilos of soda. The dyestuff thus obtained constitutes a yellow orange powder and dissolves in water with greenish-yellow and in concentrated sulphuric acid with yellow coloration. It furnishes in dyeing and printing on wool green-yellow shades of good fastness. The dyestuff obtained according to this example has the following formula:

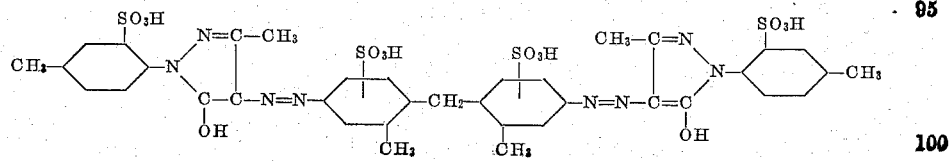

Example 3

34 kilos of 3:3'-diamino-4:4'-dimethyldiphenylmethane are sulphonated in a similar manner to that above described. The obtained 3:3'-diamino-4:4'-dimethyldiphenylmethane disulphonic acid is coupled with 88 kilos of 1(2'-chloro-5'-sulphonic acid-phenyl)-3-methyl-5-pyrazolone and 50 kilos of soda. The dyestuff worked up in the usual manner constitutes a yellow-orange powder and dissolves in water with greenish-yellow and in concentrated sulphuric acid with brown-yellow coloration. It yields in dyeing and printing on wool pure yellow shades. The dyestuff obtained according to this example has the following formula:

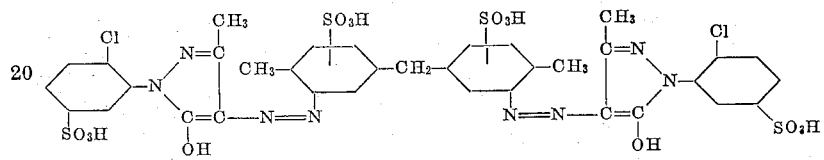

Example 4

34 kilos of 4:4'-diamino-3:3'-dimethyldiphenylmethane are sulphonated as described. The obtained 4:4'-diamino-3:3'-dimethyldiphenylmethane disulphonic acid is coupled with 97 kilos of 1(2':5'-dichloro-4'-sulphonic acid-phenyl)-3-methyl-5-pyrazolone and 50 kilos of soda. The dyestuff worked up in the usual way constitutes an orange powder and dissolves in water with greenish-yellow and in concentrated sulphuric acid with yellow coloration. It yields in dyeing and printing on wool pure yellow tints of good fastness. The dyestuff obtained according to this example has the following formula:

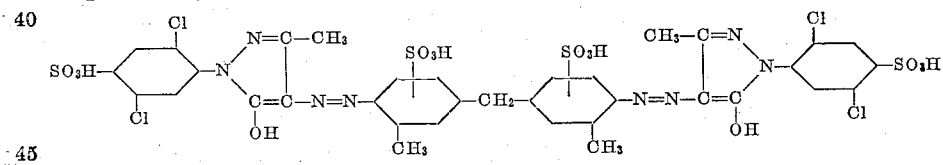

printing on wool beautiful green-yellow to yellow shades with good fastness to light, fulling, sulphur, leaving cotton effects pure white and being particularly adapted for direct prints on wool.

In witness whereof I have hereunto signed my name this 22nd day of August, 1930.

ADOLF KREBSER.

What I claim is:—

1. A process for the manufacture of disazodyestuffs for dyeing and printing wool, consisting in coupling tetrazocompounds of diaminoditolylmethanedisulphonic acids with two molecules of a pyrazolonesulphonic acid.

2. A process for the manufacture of disazodyestuffs for dyeing and printing wool, consisting in coupling tetrazocompounds of diaminoditolylmethanedisulphonic acids with two molecules of 1(4'-methyl-2'-sulphonic acid)-3-methyl-5-pyrazolone.

3. As new articles of manufacture, the hereinbefore described disazodyestuffs having the constitution of ditolylmethanedisulphonic acid-disazo-bis-1-phenyl-3-methyl-5-pyrazolonemonosulphonic acids, said dyestuffs being soluble in water and concentrated sulphuric acid with green-yellow to yellow coloration and yielding in dyeing and